United States Patent
Wilkinson

(10) Patent No.: US 9,436,653 B2
(45) Date of Patent: Sep. 6, 2016

(54) SHARED-BANDWIDTH MULTIPLE TARGET REMOTE COPY

(75) Inventor: John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 13/393,809

(22) PCT Filed: May 21, 2010

(86) PCT No.: PCT/EP2010/057044
§ 371 (c)(1),
(2), (4) Date: Mar. 1, 2012

(87) PCT Pub. No.: WO2011/026661
PCT Pub. Date: Mar. 10, 2011

(65) Prior Publication Data
US 2012/0166588 A1    Jun. 28, 2012

(30) Foreign Application Priority Data
Sep. 3, 2009 (EP) .................................. 09169353

(51) Int. Cl.
*G06F 15/173* (2006.01)
*G06F 3/06* (2006.01)
*G06F 11/20* (2006.01)

(52) U.S. Cl.
CPC .......... *G06F 15/17306* (2013.01); *G06F 3/065* (2013.01); *G06F 3/0613* (2013.01); *G06F 3/0635* (2013.01); *G06F 3/0689* (2013.01);
(Continued)

(58) Field of Classification Search
CPC .................. G06F 17/30206; H04L 67/1095; H04L 67/1097; H04L 2012/568; H04L 47/125

USPC ................................... 709/216, 217, 219, 245
See application file for complete search history.

(56) References Cited

U.S. PATENT DOCUMENTS 6,237,008 B1   5/2001   Beal et al.
6,526,419 B1   2/2003   Burton et al.
(Continued)

FOREIGN PATENT DOCUMENTS

WO     2011/026661 A1   3/2011

OTHER PUBLICATIONS

Co-pending U.S. Appl. No. 14/195,292, filed Nov. 24, 2015.*
(Continued)

*Primary Examiner* — Scott M Sciacca
(74) *Attorney, Agent, or Firm* — Zilka-Kotab, PC

(57) ABSTRACT

A computer management apparatus one embodiment includes a split component configured to split data into a plurality of data elements; a send component configured to send each one of the plurality of data elements to a different location selected from a plurality of locations in response to the split component splitting the data, wherein each data element is different; and a message component configured to send a message to each of the locations. A computer management apparatus in another embodiment includes a receive component configured to receive a first data element; an analyze component configured to recieve a message, wherein the message comprises an address of each of the further locations; and a send component configured to send the first data element to each of the further locations of the plurality of further locations in response to the analyze component determining the address of each of the further locations.

14 Claims, 6 Drawing Sheets

(52) U.S. Cl.
CPC ........ *G06F 11/2058* (2013.01); *G06F 11/2066* (2013.01); *G06F 2206/1012* (2013.01)

(56) References Cited

U.S. PATENT DOCUMENTS

| | | | |
|---|---|---|---|
| 7,318,133 B2 | 1/2008 | Yagawa et al. | |
| 7,346,734 B2 | 3/2008 | Chen et al. | |
| 7,472,241 B2 | 12/2008 | Uchiyama et al. | |
| 7,490,205 B2 | 2/2009 | Benhase et al. | |
| 7,769,722 B1* | 8/2010 | Bergant et al. | 707/681 |
| 9,218,313 B2 | 12/2015 | Wilkinson | |
| 2002/0120874 A1* | 8/2002 | Shu et al. | 713/201 |
| 2007/0067670 A1* | 3/2007 | Ebsen et al. | 714/7 |
| 2007/0118840 A1 | 5/2007 | Amaki et al. | |
| 2007/0239934 A1 | 10/2007 | Watanabe | |
| 2010/0037056 A1* | 2/2010 | Follis et al. | 713/171 |
| 2010/0150157 A1* | 6/2010 | Wang et al. | 370/392 |
| 2011/0071841 A1* | 3/2011 | Fomenko et al. | 705/1.1 |
| 2013/0144977 A1 | 6/2013 | Wilkinson | |

OTHER PUBLICATIONS

PCT International Search Report and Written Opinion from application No. PCT/EP2010/057044 dated Jul. 29, 2010.
Non-Final Office Action from U.S. Appl. No. 13/756,290 dated Oct. 28, 2013.
Final Office Action from U.S. Appl. No. 13/756,290 dated Apr. 28, 2014.
Non-Final Office Action from U.S. Appl. No. 13/756,290, dated Dec. 4, 2014.
Final Office Action from U.S. Appl. No. 13/756,290, dated May 19, 2015.
Notice of Allowance from U.S. Appl. No. 13/756,290, dated Aug. 12, 2015.
Wilkinson, U.S. Appl. No. 13/756,290, filed Jan. 31, 2013.
Corrected Notice of Allowance from U.S. Appl. No. 13/756,290, dated Sep. 4, 2015.
Wilkinson, U.S. Appl. No. 14/951,292, filed Nov. 24, 2015.

* cited by examiner

SHARED-BANDWIDTH MULTIPLE TARGET REMOTE COPY

RELATED APPLICATIONS

This application claims priority to PCT Patent Application No. PCT/EP2010/057044, filed May 21, 2010, and from European Patent Application No. 09169353.1 filed on Sep. 3, 2009, which are all herein incorporated by reference.

BACKGROUND

The present invention relates to copying data between storage devices. In particular, the invention relates to an apparatus and computer program for sharing bandwidth between multiple remote copy targets.

Peer to Peer Remote Copy (PPRC) is a method to replicate a storage volume to another storage unit over extended distances to a remote site. PPRC is used to provide business continuity and disaster recovery capabilities. A PPRC may be performed synchronously or asynchronously. In Synchronous PPRC, each write to a local site is performed to the remote site as well. The Synchronous PPRC is complete when the write completes to both sites. An example of a Synchronous PPRC implementation is IBM® Metro Mirror (IBM is a registered trademark of International Business Machines Corporation in the United States, other countries, or both.) In Asynchronous PPRC, each write is made to the local site, and then copied to the remote site when time permits. The Asynchronous PPRC is complete when the write completes to the local site. Different copy functions may be combined to provide remote copy functionality. For example, a Point in Time copy may be made at the local site between a source volume and a target volume, and then a remote copy may be made from the target volume to a remote site. An example of a combinatorial implementation is IBM Global Mirror. PPRC may be used to provide very fast data recovery due to failure of the primary site.

PPRC may also be extended to more than one remote site to improve business continuity and disaster recovery capabilities.

If an organisation has three sites, A, B, and C, and wishes to replicate data from a storage system at A onto similar systems at B and C using a PPRC method, a high-bandwidth network connection is required from A to B, and from A to C. An example of a suitable network connection protocol is Fibre Channel (FC). However, FC links are expensive as they are priced by distance and bandwidth.

BRIEF SUMMARY

A computer management apparatus for sharing bandwidth in a data processing system having a plurality of locations according to one embodiment includes a split component configured to split data into a plurality of data elements; a send component configured to send each one of the plurality of data elements to a different location selected from a plurality of locations in response to the split component splitting the data, wherein each data element is different; and a message component configured to send a message to each of the locations.

Another embodiment includes a computer management apparatus for sharing bandwidth in a data processing system having a plurality of locations, where the plurality of locations includes a first location and plurality of further locations. The apparatus includes a receive component configured to receive a first data element; an analyze component configured to receive a message, wherein the message comprises an address of each of the further locations; and a send component configured to send the first data element to each of the further locations of the plurality of further locations in response to the analyze component determining the address of each of the further locations.

A system according to one embodiment may include one or more of each of the apparatuses described above.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

The present invention will now be described, by way of example only, with reference to preferred embodiments, as illustrated in the following figures.

DETAILED DESCRIPTION

Figure 1:
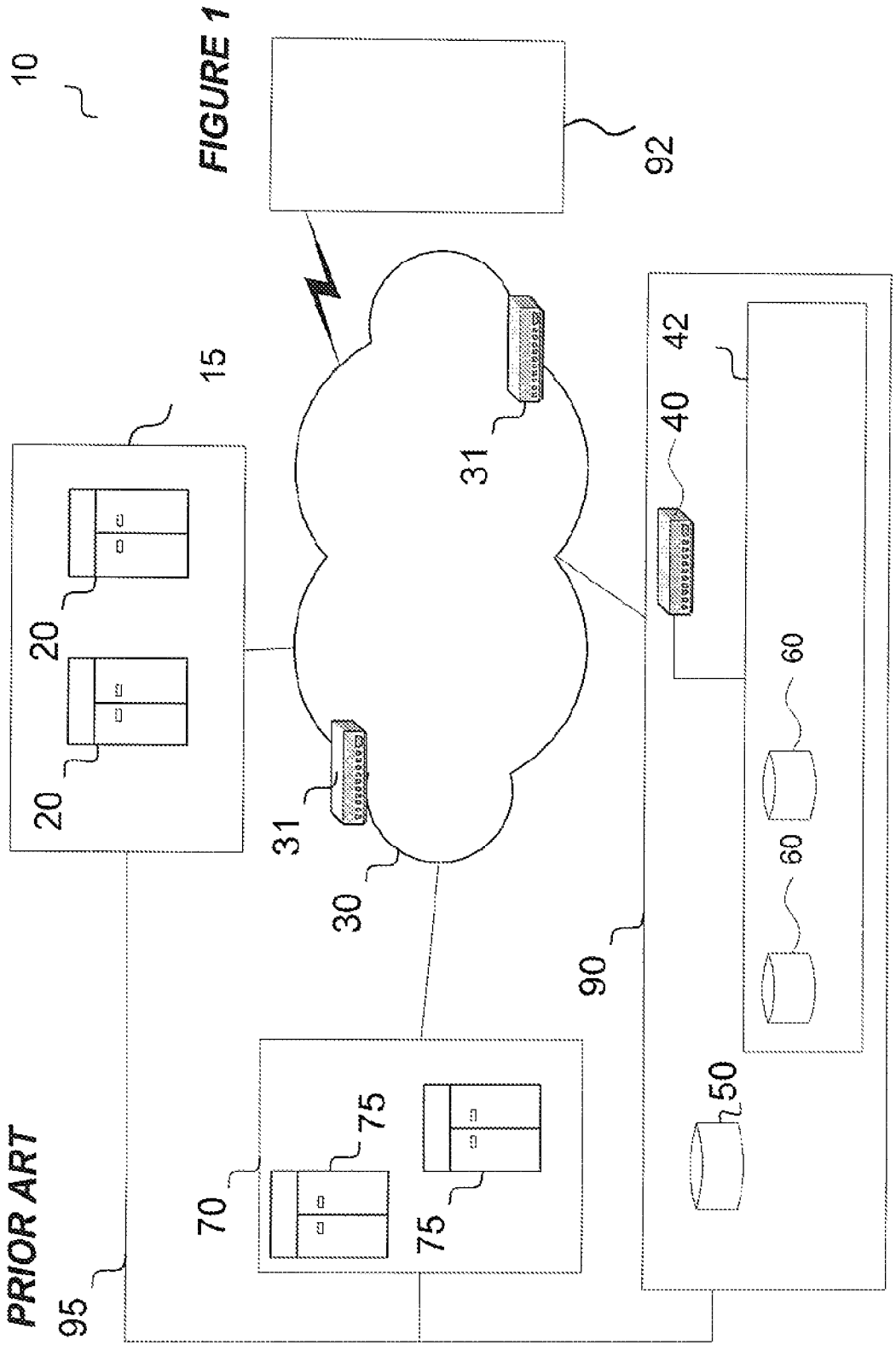
FIG. 1 is a block diagram depicting a data processing system, in accordance with the prior art, and in which a preferred embodiment of the present invention may be implemented.

One general embodiment of the present invention provides a computer management apparatus for sharing bandwidth in a data processing system, where the data processing system comprises a plurality of locations, the apparatus comprising: a split component configured to split data into a plurality of data elements; a send component configured to send each one of the plurality of data elements to a different location selected from the plurality of locations in response to the split component splitting the data, where each data element is different, responsive to the split component splitting the data; and a message component configured to send a message to each of the locations.

Advantageously, various embodiments of the present invention allow bandwidth requirements of a remote copy environment to be reduced, without reducing the amount of data that may be copied.

Another general embodiment of the present invention provides a computer management apparatus for sharing bandwidth in a data processing system, where the data processing system includes a plurality of locations typically in communication with a host, where the plurality of locations includes a first location and plurality of further locations. The apparatus includes: a receive component configured to receive a first data element; an analyze component configured to receive a message, where the message comprises an address of each of the further locations; and a send component configured to send the first data element to each of the further locations of the plurality of further locations in response to the analyze component determining the address of each of the further locations.

Advantageously, various embodiments of the present invention enable an apparatus on a remote location to forward on data to the other remote locations, and also to receive data from the other remote locations. Received data may be combined to replicate the data at the local location.

In yet another general embodiment, a method for sharing bandwidth in a data processing system that includes a plurality of locations includes splitting data into a plurality of data elements; sending each one of the plurality of data elements to a different location selected from the plurality of locations, wherein each data element is different; and sending a message to each of the locations.

In a further general embodiment of the present invention, a method for sharing bandwidth in a data processing system, wherein the data processing system comprises a plurality of locations, typically in communication with a host, and where the plurality of locations comprises a first location and plurality of further locations, the method comprising the steps of: receiving a first data element; receiving a message, wherein the message comprises an address of each of the further locations; and sending the first data element to each of the further locations of the plurality of further locations, responsive to determining the address of each of the further locations.

In yet another general embodiment, a system for sharing bandwidth in a data processing system having at least one local location and a plurality of remote locations is provided. The system includes: a local apparatus operable on the at least one local location, wherein the local apparatus comprises: a split component operable for splitting data into a plurality of data elements; a first send component, operable for sending each one of the plurality of data elements to a different remote location selected from the plurality of remote locations, wherein each data element is different, responsive to the split component splitting the data; and a message component, operable for sending a message to each of the remote locations; and a remote apparatus, operable on each remote location, wherein the remote apparatus comprises: a receive component, operable for receiving a first data element selected from the plurality of data elements; an analyze component, operable for receiving the message, wherein the message comprises an address of each of the other remote locations; and a second send component, operable for sending the first data element to each of the other remote locations, responsive to the analyze component determining the address of each of the other remote locations.

FIG. 1 is a block diagram depicting a data processing system 10, in accordance with the prior art, and which may be modified and improved to include an embodiment of the present invention may be implemented.

The illustrated data processing system 10 comprises a host server node subsystem 15 having a set of server nodes 20, which are connectable through a network 30 to a back-end storage subsystem 90. A network 30 typically comprises network devices 31, for example switches, and cabling that connect a server node subsystem 15 to a hardware back-end storage subsystem 90. The storage subsystem 90 may comprise a variety of physical storage devices having, for example, stand-alone a Just a Bunch of Disks(JBOD) device 50, and a Redundant Array of Independent Disks (RAID) array 42. The RAID array 42 comprises a plurality of storage devices 60. Devices 42, 50 may be presented to the server node subsystem 15 as a set of physical or logical storage volumes (not depicted). Typically the system 10 is managed by a management subsystem 70 comprising management servers 75, connectable to the server node subsystem 15, the storage subsystem 90, and the network devices 31 through the network 30 or through a separate Local Area Network(LAN) 95. Typically, a RAID Controller 40 controls the functionality of the RAID array 42, including data accesses and power controls to the individual storage devices 60. Read and write commands may be sent to the storage subsystem 90 by a requester (not depicted) that may be an application program operable in the data processing system 10. A further storage subsystem 92 may be present at a remote site.

Figure 2:
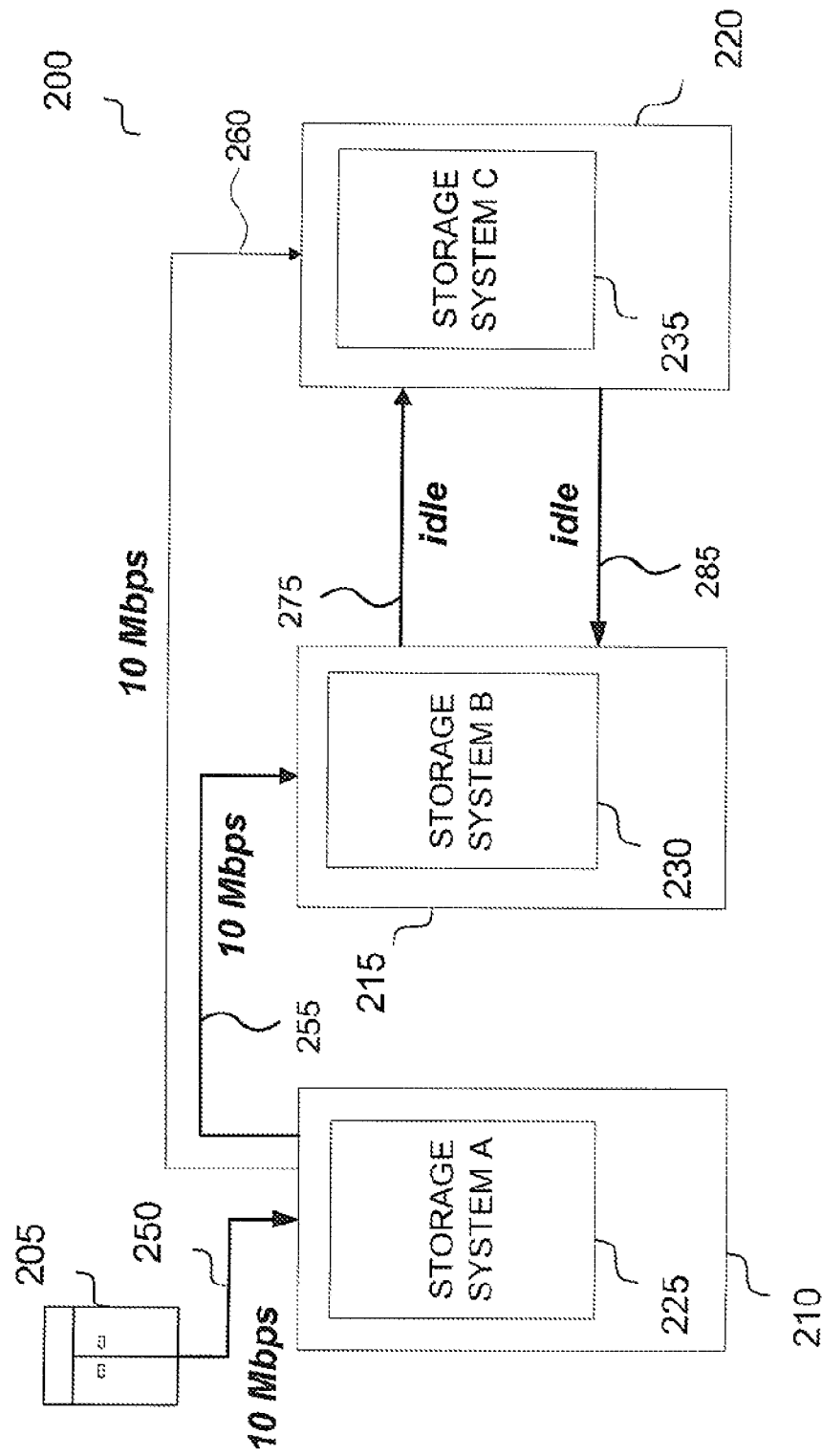
FIG. 2 is also a block diagram depicting a data processing system, in accordance with the prior art, and in which a preferred embodiment of the present invention may be implemented.

FIG. 2 is also a block diagram depicting a data processing system 200, in accordance with the prior art, and which may be modified and improved to include an embodiment of the present invention. FIG. 2 depicts an exemplary data processing system 200 with a local site 210, and two remote sites 215, 220. A host server node subsystem 205 is connectable through a network 250 to a local back-end storage subsystem A 225 at local site 210. The local site 210 is connectable to remote site B 215 through output network 255 and input network (not depicted). Local site 210 is connectable to remote site C 220 through output network 260 and input network (not depicted). There are also network connections 275, 285 between remote site B 215 and remote site C 220. Remote site B 215 comprises a storage subsystem B 230, and remote site C 220 comprises a storage subsystem C 235.

As an example, according to the prior art, if replication is required at rate of 10 Mbps, the network connections from the local site 210 to remote site B 215 (A→B), and from local site 210 to remote site C 220 (A→C) each need to have 10 Mbps of bandwidth. The same stream of data is sent from local site 210 to remote site B 215 (A→B) as is sent from local site 210 to remote site C 220 (A→C). For symmetry and redundancy, there is a link 275, 285 from remote site B 215 to remote site C 220, also with a 10 Mbps bandwidth. The host server node subsystem 205 writes data on network 250 to the local site 210 at 10 Mbps. To replicate writes to remote site B 215 and remote site C 220, network 255, 260 with 10 Mbps of bandwidth are required. The remaining networks 275, 285 are idle, except for non-data traffic.

Data may be sent from A→B, and then remote site B 215 may forward the data to remote site C 220. This still requires the links to be able to cope with 10 Mbps of bandwidth.

Figure 3:
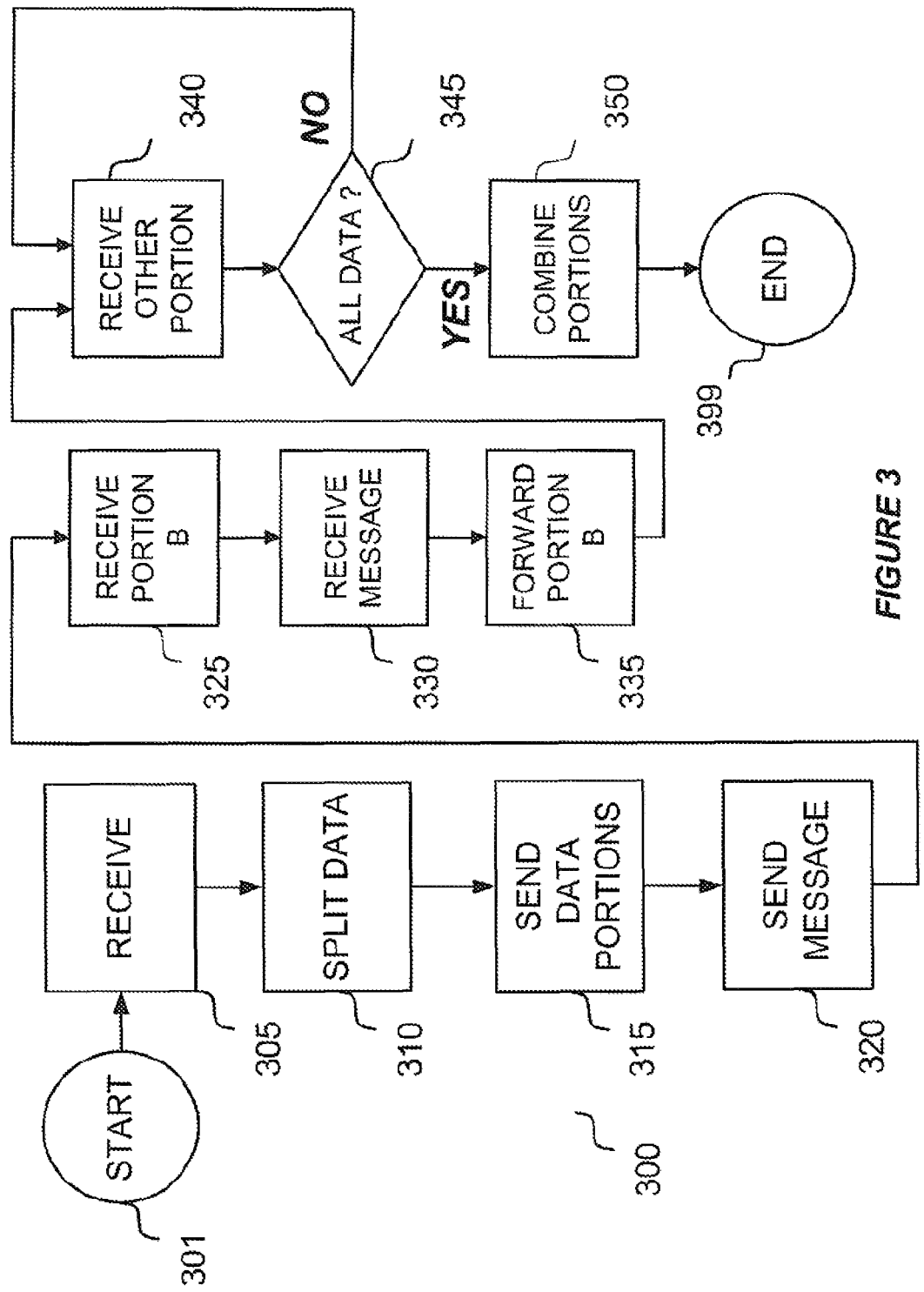
FIG. 3 is a high-level exemplary schematic flow diagram depicting typical operation method steps performed for copying data in a data processing system, in accordance with a preferred embodiment of the present invention.
Figure 4:
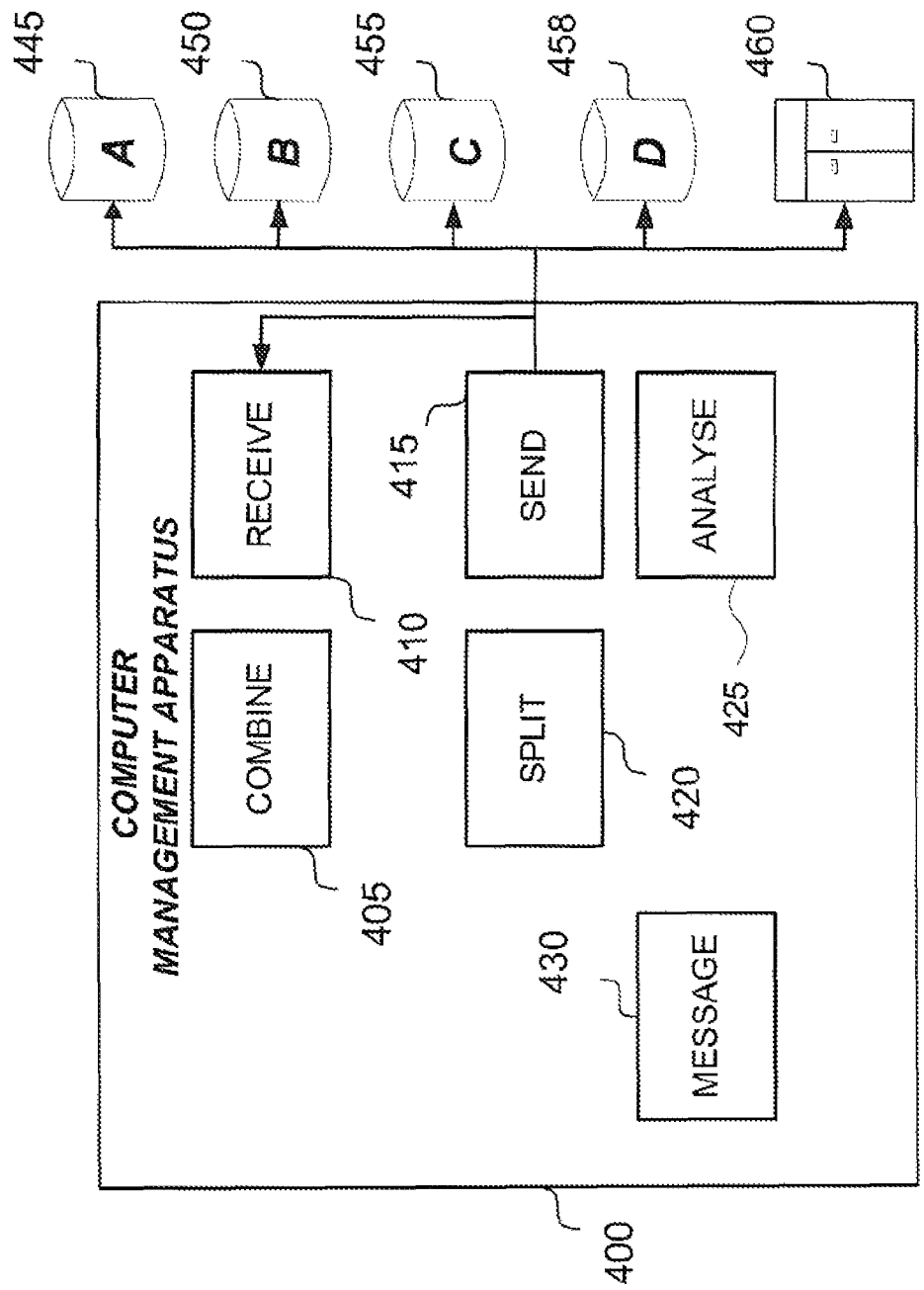
FIG. 4, is an exemplary block diagram depicting a computer management apparatus in which the present invention may be embodied.
Figure 5:
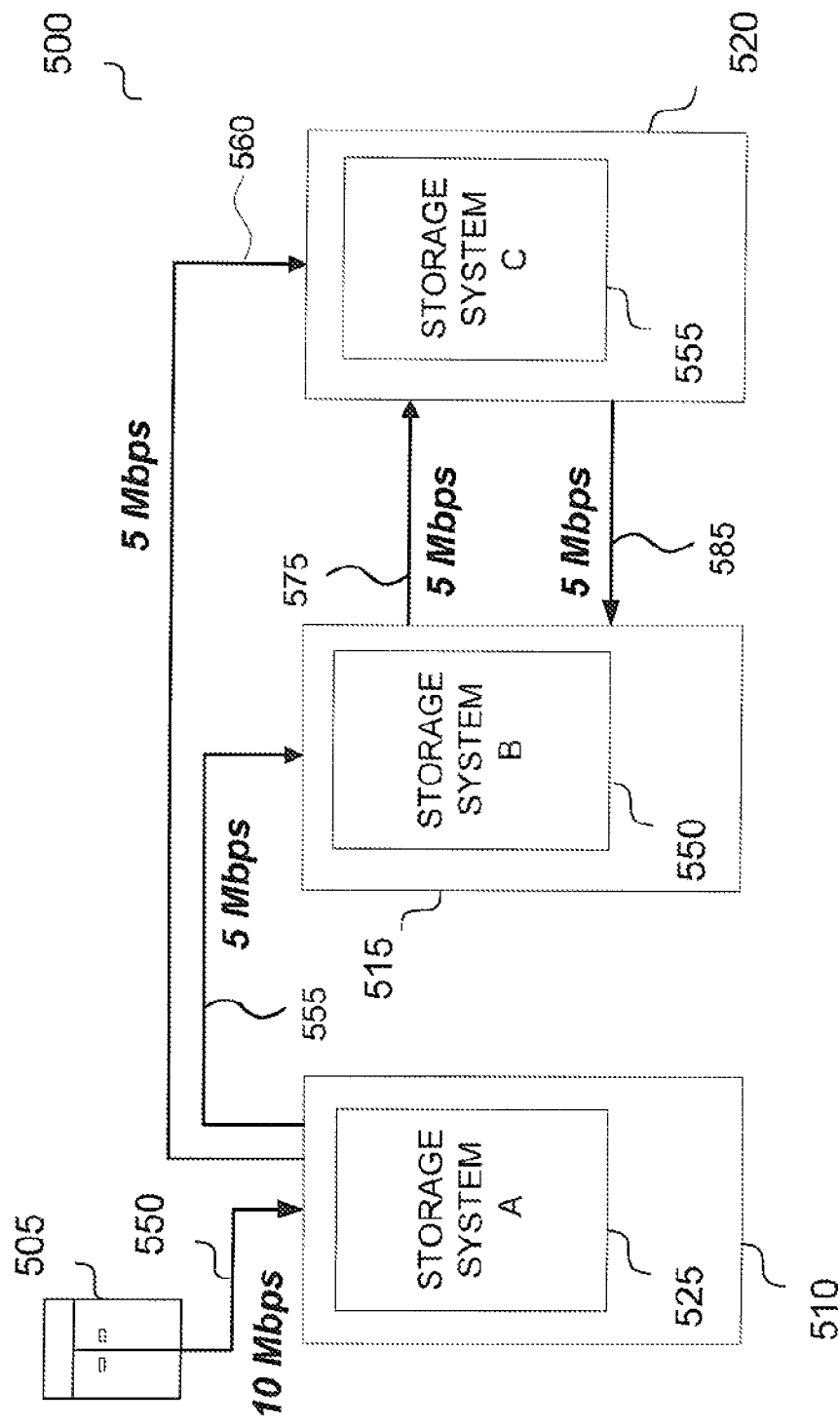
FIG. 5 is also a block diagram depicting a data processing system, in which a preferred embodiment of the present invention may be implemented.

FIG. 3, which may be read in conjunction with FIGS. 4 and 5, is a high-level exemplary schematic flow diagram 300 depicting typical operation method steps performed for copying data in a data processing system, in accordance with a preferred embodiment of the present invention. FIG. 4, is an exemplary block diagram depicting a computer management apparatus in which various embodiments of the present invention may be embodied. FIG. 5 is also a block diagram depicting a data processing system 10, 200, in which a preferred embodiments of the present invention may be implemented. FIG. 5 depicts an exemplary data processing system 500 with a local site 510 and two remote sites 515, 515.

Referring to FIGS. 4-5, respectively, in a preferred embodiment of the present invention, the data is split at local site 445, 510 into portions. One portion is sent on network 555 to remote site B 450, 515 and the other portion is sent on network 560 to remote site C 455, 520. Remote site B 450, 515 comprises a storage subsystem B 530 and remote site C 455, 520 comprises a storage subsystem C 535. The remote sites 450, 515, 455, 515 send each other the portion that they were sent by the local site 445, 510. In a preferred embodiment the portions are of equal size. Advantageously, each network 555, 560 need only provide half the bandwidth of the prior art, as depicted in FIG. 2.

To illustrate a preferred embodiment of the invention, an exemplary bandwidth of 10 Mbps will be used, as the required replication rate.

Referring to FIG. 3, and also with reference to the components of FIGS. 4 and 5, the method starts at step 301. Steps 305, 310, 315 and 320 are operable at the local site 445, 510. At step 310, a receive component 410 of a computer management apparatus 400 at local site 445, 510 receives data from a host server node subsystem 460, 505 over the network 550 at 10 Mbps. At step 310, a split component 420 of a computer management apparatus 400 operable at the local site 445, 510 splits the received data into different data elements: portion B and portion C. In this example, the data is split into two equal sized elements, referred to below as portions.

At step 315, a send component 415 at the local site 445, 510 sends portion B to remote site B 450, 515, and portion C to remote site C 455, 520 over the respective output networks 555, 560. The bandwidth required for both connections is 5 Mbps. At step 320, a message component 430 at the local site 445, 510 sends a message to each of the remote sites 450, 515, 455, 520. The message comprises an address of each of the locations. In one approach, the message comprises, for example, information about both portions, and the address of the remote sites 450, 515, 455, 520.

Steps 325, 330, 335, 340 and 345 are operable at each of the remote sites. As an example, remote site B 450, 515, is used to illustrate the steps. However, an equivalent set of steps is operable at remote site C 455, 520. At step 325, a receive component at remote site B 450, 515 receives a first data element, e.g., portion B. At step 330, an analyze component 425 at remote site B 450, 515 receives the message sent at step 320 by the message component 430 at the local site 445, 510. The analyze component 425 at remote site B 450, 515 also analyzes the message to determine information about portion C, and the address of remote site C 455, 520. At step 335, a send component 415 at remote site B 450, 515 sends portion B to remote site C 455, 520 over a network 575 at 5 Mbps.

At step 340, the receive component at remote site B 450, 515 receives a second data element, e.g., portion C from remote site C 455, 520 over a network 585 at 5 Mbps. At step 345, the analyze component determines whether all portions have been received. If further portions are required, the method returns to step 340. However, if all portions have been received, at step 350, a combine component 405 at remote site B 450, 515 combines the portions, e.g., portion B and portion C and stores the resulting data. The method ends at step 399.

FIG. 3 is set forth as a logical flow chart diagram. As such, the depicted order and labeled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

In an alternative embodiment, the portions are of different size. The split of data may split at the disk level, so a storage system copying ten disks may split the first five disks into portion B, and the second five disks into portion C. In this case, the replication protocol is unaware of the split as this is a static configuration. It is limited, though, as it required the input/output (IO) workload to the ten disks to be spread such that a similar amount of data is sent to each disk. IO to any given disk may never reach the full performance of the inter-site links.

In an alternative embodiment, data is split at a batch level. Batch IO operations on local site 445, 510 may be applied on remote sites 450, 515, 455, 520. Each batch IO completing all writes from one batch before starting the next. Even batches may be sent (A→B→C). Odd batches may be sent (A→C→B). The combine component 405 may then combine the batches in the correct order.

In an alternative embodiment data is split at the write level. Writes may be sent in any order to the remote sites 450, 515, 455, 520, if the local site 445, 510 has not yet completed the write back to the host server node subsystem 460, 505. In this case, writes may be sent alternatively (A→B→C), and (A→C→B). Messages regarding completion of IO may either come back the same path or shortcut directly back to local site 445, 510.

In a preferred embodiment, data recovery from remote site B 450, 515, to local site 445, 510 use the method of FIG. 3 to send portion B (B→A), and portion C (B→C→A). In an alternative embodiment, portion B is sent (B→A), and portion C (C→A), using the portion stored on remote site C 455, 520.

The method of FIG. 3 may also be applied to further remote sites. An example is depicted in FIG. 6.

Figure 6:
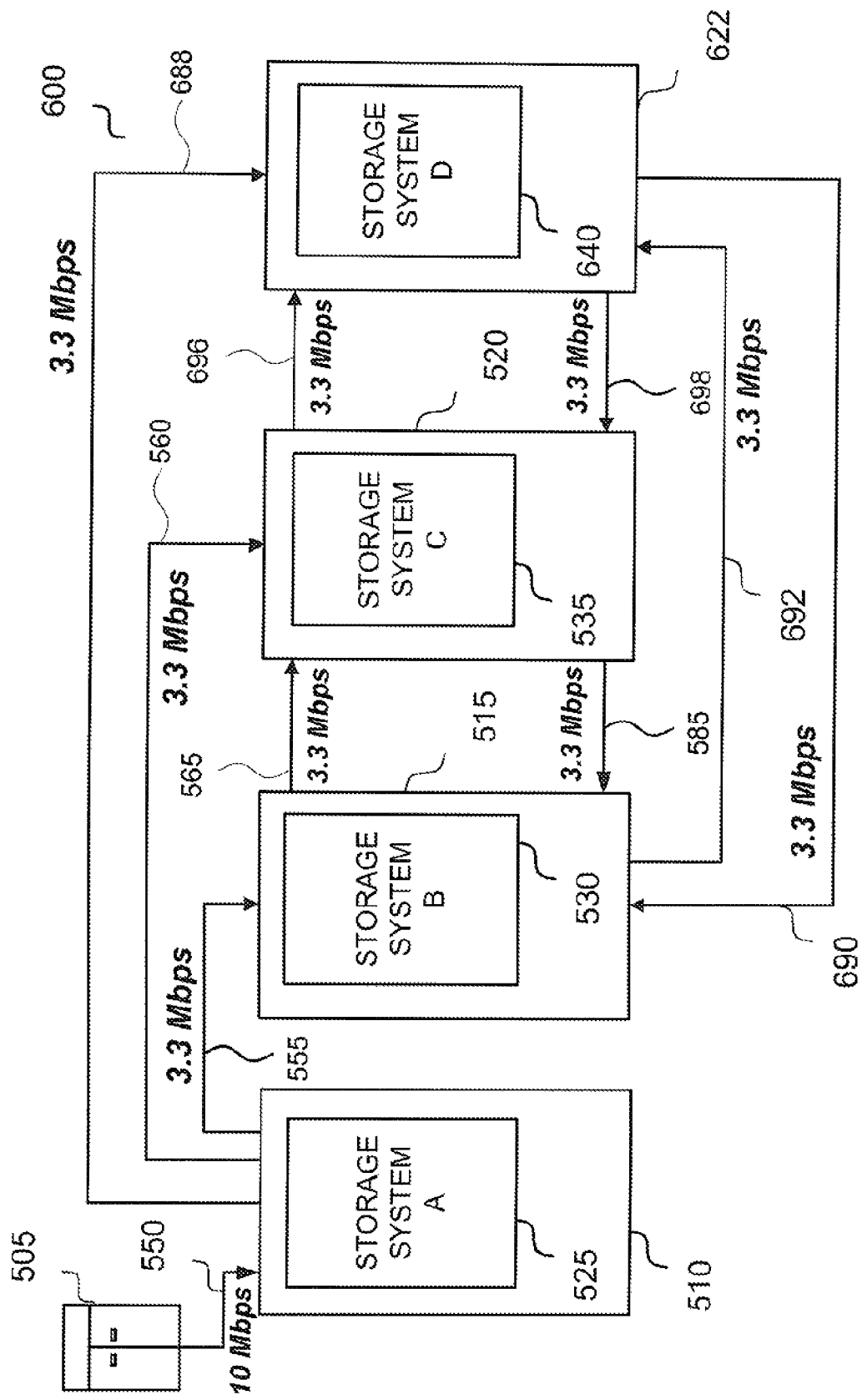
FIG. 6 is also block diagram depicting a data processing system, in which a preferred embodiment of the present invention may be implemented.

FIG. 6 is also block diagram depicting a data processing system 600 in which a preferred embodiment of the present invention may be implemented. FIG. 6 depicts an exemplary data processing system 600 similar to that 500 shown in FIG. 5, but with an additional remote site D 622 (see also 458 of FIG. 4), comprising a storage subsystem D 640. Remote site D 622 is connectable through network connections 696, 698 to remote site C 520 (see also 450 of FIG. 4), and through network connections 565, 585 to remote site B 515 (see also 450 of FIG. 4). Data received at the local site 510 at 10 Mbps is split into three portions, and sent to the remote sites 515, 520, 622 at about a third of 10 Mbps (e.g., 3.3 Mbps). Each remote site 515, 520, 622 forwards on the portion that it received to the other remote sites 515, 520, 622. The portions are combined and stored when all portions have been received. In this example connections are made at 3.3 Mbps between remote sites 515, 520, 622.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be appreciated that the method and arrangement described above may also suitably be performed fully or partially in software running on one or more processors (not depicted in the Figures), and that the software may be provided in the form of one or more computer program elements carried on any suitable data-carrier (also not depicted in the Figures) such as a magnetic or optical storage device or the like.

For the avoidance of doubt, the term "comprising", as used herein throughout the description and claims is not to be construed as meaning "consisting only of". Also for the avoidance of doubt, copying one location to another, as used herein throughout the description and claims, is to be construed as meaning copy the data contents of one location to the other location.

The invention claimed is:

1. A computer management apparatus for sharing bandwidth in a data processing system having a plurality of locations, the apparatus comprising a processor and a memory which stores instructions, wherein the instructions, when executed by the processor, cause the apparatus to implement a plurality of components comprising:
   a split component, the split component being configured to split data into a plurality of data elements;
   a send component, the send component being configured to send, from a sender, each one of the plurality of data elements to a different location selected from a plurality of locations in response to the split component splitting the data, wherein each data element is different; and
   a message component, the message component being configured to send, from the sender after the data elements are sent, a message to each of the locations that received one of the data elements, wherein the message is sent from the sender separate from the data elements, and the message includes:
      information about the all of the different data elements, and
      for each location that received one of the data elements, an address of the location,
   wherein the message includes all of the addresses of all of the locations of the plurality of locations that received one of the different data elements of the data, such that the message is configured to be used by each of the locations that received one of the data elements and the message to:
      determine the address of each of the locations that received other of the data elements, and
      using the addresses in the message, send the data element received by the location to each location of the plurality of locations that received from the sender other of the data elements.

2. The apparatus of claim 1, wherein the split component is further configured to split the data into equal size data elements.

3. The apparatus of claim 1, wherein the send component sends the data elements to each location alternately.

4. The apparatus of claim 1, wherein the memory further comprises instructions that, when executed by the processor, cause the apparatus to implement a receive component configured to receive a second data element split from second data from one of the locations; and an analyze component configured to receive a second message from the one of the locations and send the second data element to another of the locations identified in the second message.

5. The apparatus of claim 4, wherein the receive component is further configured to receive a third data element split from the second data; and wherein the memory further comprises instructions that, when executed by the processor, cause the apparatus to implement a combine component, the combine component being configured to combine the second and third data elements for recreating the second data, the second data being stored after recreation thereof.

6. The apparatus of claim 1, wherein the data element sent to each unique location is different than the data elements sent to the other locations.

7. The apparatus of claim 1, wherein the data is split into the plurality of data elements at a disk level, such that a storage system copying a plurality of disks splits a first half of the disks into a first one of the data elements, and splits a second half of the disks into a second one of the data elements.

8. A computer management apparatus for sharing bandwidth in a data processing system having a plurality of locations, wherein the plurality of locations includes a first location and plurality of further locations, the apparatus comprising a processor and a memory which stores instructions, wherein the instructions, when executed by the processor, cause the apparatus to implement a plurality of components comprising:
   a receive component, the receive component being configured to receive a first data element of first data from the first location and other data elements of the first data from the further locations, wherein each data element of the first data is different;
   an analyze component, the analyze component being configured to receive, after receiving the first data element of the first data from the first location, a message from the first location, wherein the message is sent from the first location separate from the first data element received from the first location, and the message comprises:
      an address of each of the locations of the plurality of locations that received one of the different data elements of the first data, such that the message includes all of the addresses of all of the locations of the plurality of locations that received one of the different data elements of the first data; and
   a send component, the send component being configured to send the first data element to each of the further locations of the plurality of further locations in response to the analyze component determining the address of each of the further locations from the message.

9. The apparatus of claim 8, wherein the receive component is further configured to receive a second data element of the first data from one of the further locations.

10. The apparatus of claim 9, wherein the memory further comprises instructions that, when executed by the processor, cause the apparatus to implement a combine component, the combine component being configured to combine the first data element with the second data element.

11. The apparatus of claim 10, wherein the analyze component is configured to determine whether all of the data elements of the first data have been received from the plurality of locations, wherein the combine component combines the data elements of the first data for re-creating the first data upon determining that all data elements have been received.

12. The apparatus of claim 11, wherein the first data remains stored on the first location and wherein the first data is recreated and stored in the apparatus.

13. A system comprising the apparatus of claim 8, and further comprising a second apparatus, the second apparatus comprising a second processor and a second memory which stores second instructions, wherein the second instructions, when executed by the second processor of the second apparatus, cause the second apparatus to implement a second plurality of components including:
   a split component, the split component being configured to split the first data into the different data elements of the first data, the different data elements of the first data including the first data element;
   a send component, the send component being configured to send the first data element to the apparatus and other of the data elements each to a different location; and
   a message component, the message component being configured to send the message to the apparatus.

14. The system of claim 13, wherein each of the apparatuses are configured to receive all of the data elements of the first data, combine the received data elements thereby replicating the first data, and store the first data.

* * * * *